United States Patent
Vernochet

(10) Patent No.: US 9,863,797 B2
(45) Date of Patent: Jan. 9, 2018

(54) CORRECTION OF A TEMPERATURE MEASUREMENT OF A THERMOMETRIC RESISTANCE-TYPE TEMPERATURE PROBE

(71) Applicant: SNECMA, Paris (FR)

(72) Inventor: Maurice Georges Vernochet, La Rochette (FR)

(73) Assignee: SNECMA, Paris (FR)

( * ) Notice: Subject to any disclaimer, the term of this patent is extended or adjusted under 35 U.S.C. 154(b) by 551 days.

(21) Appl. No.: 14/391,812

(22) PCT Filed: Apr. 23, 2013

(86) PCT No.: PCT/FR2013/050906
§ 371 (c)(1),
(2) Date: Oct. 10, 2014

(87) PCT Pub. No.: WO2013/160612
PCT Pub. Date: Oct. 31, 2013

(65) Prior Publication Data
US 2015/0096366 A1    Apr. 9, 2015

(30) Foreign Application Priority Data
Apr. 23, 2012   (FR) ..................................... 12 53698

(51) Int. Cl.
*G01K 15/00*   (2006.01)
*G01K 7/00*    (2006.01)
(Continued)

(52) U.S. Cl.
CPC ......... *G01F 1/6965* (2013.01); *G01D 3/0365* (2013.01); *G01F 1/69* (2013.01);
(Continued)

(58) Field of Classification Search
USPC .................... 374/1, 183, 185, 110, 166, 45
See application file for complete search history.

(56) References Cited

U.S. PATENT DOCUMENTS

| | | | | |
|---|---|---|---|---|
| 6,280,081 B1 * | 8/2001 | Blau | ...................... | G01J 1/18 323/316 |
| 6,334,093 B1 * | 12/2001 | More | ...................... | G01K 3/14 374/E3.009 |

(Continued)

OTHER PUBLICATIONS

French Preliminary Search Report dated Feb. 12, 2013 in Patent Application No. 1253698 (with English translation of categories of cited documents).
(Continued)

*Primary Examiner* — Mirellys Jagan
(74) *Attorney, Agent, or Firm* — Oblon, McClelland, Maier & Neustadt, L.L.P.

(57) ABSTRACT

The invention relates to a temperature measurement method using a thermometric resistance-type temperature probe (1) comprising at least two electroconductive sensitive elements (3, 4) on the same substrate (2), wherein different parameters representative of the strength of the electric current circulating in one of said sensitive elements (3, 4) are measured, and a correction, according to said strength of the electric current circulating in said sensitive element (3, 4), is applied to a signal representative of a temperature measurement generated from the other one of said sensitive elements (3, 4), in order to correct an error created as a result of the self-heating by the Joule effect of said sensitive element (3, 4) affecting the other one of said sensitive elements (3, 4).

11 Claims, 3 Drawing Sheets

(51) Int. Cl.
*G01F 1/696* (2006.01)
*G01D 3/036* (2006.01)
*G01K 1/20* (2006.01)
*G01K 7/16* (2006.01)
*G01K 13/02* (2006.01)
*G01F 1/69* (2006.01)
*G01F 1/698* (2006.01)

(52) U.S. Cl.
CPC ............... *G01F 1/698* (2013.01); *G01K 1/20* (2013.01); *G01K 7/16* (2013.01); *G01K 13/02* (2013.01)

(56) References Cited

U.S. PATENT DOCUMENTS

| | | | | |
|---|---|---|---|---|
| 6,824,308 | B2 * | 11/2004 | Sumimoto | G01K 15/00 374/1 |
| 7,441,950 | B2 * | 10/2008 | Kamiyama | G01K 7/42 338/28 |
| 7,857,505 | B2 * | 12/2010 | Sakima | G01D 3/022 374/1 |
| 8,314,623 | B2 * | 11/2012 | Nelson | G01K 1/20 324/431 |
| 8,979,362 | B2 * | 3/2015 | Weder | G06K 19/0717 374/1 |
| 2004/0144169 | A1 | 7/2004 | Popielas et al. | |
| 2010/0316086 | A1 * | 12/2010 | Engelstad | G01K 1/14 374/1 |
| 2011/0106476 | A1 | 5/2011 | Son et al. | |
| 2011/0299562 | A1 * | 12/2011 | Hashemian | G01K 7/18 374/1 |
| 2012/0051389 | A1 * | 3/2012 | Schalles | G01K 15/005 374/1 |
| 2012/0062041 | A1 | 3/2012 | Nelson et al. | |
| 2014/0056325 | A1 * | 2/2014 | Guerra | G01K 7/24 374/1 |

OTHER PUBLICATIONS

International Search Report dated Aug. 23, 2013 in PCT/FR2013/050906.

* cited by examiner

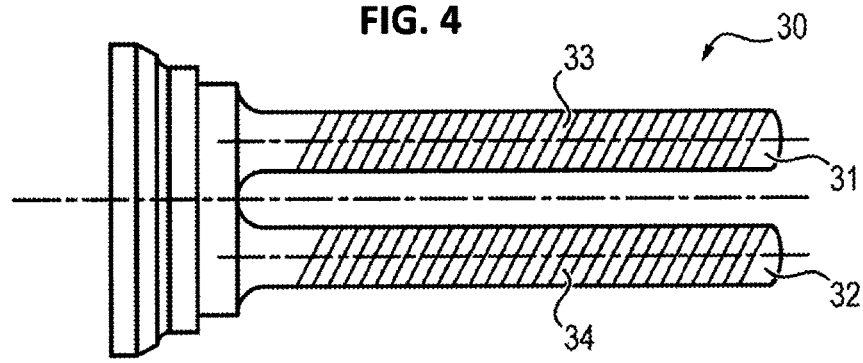
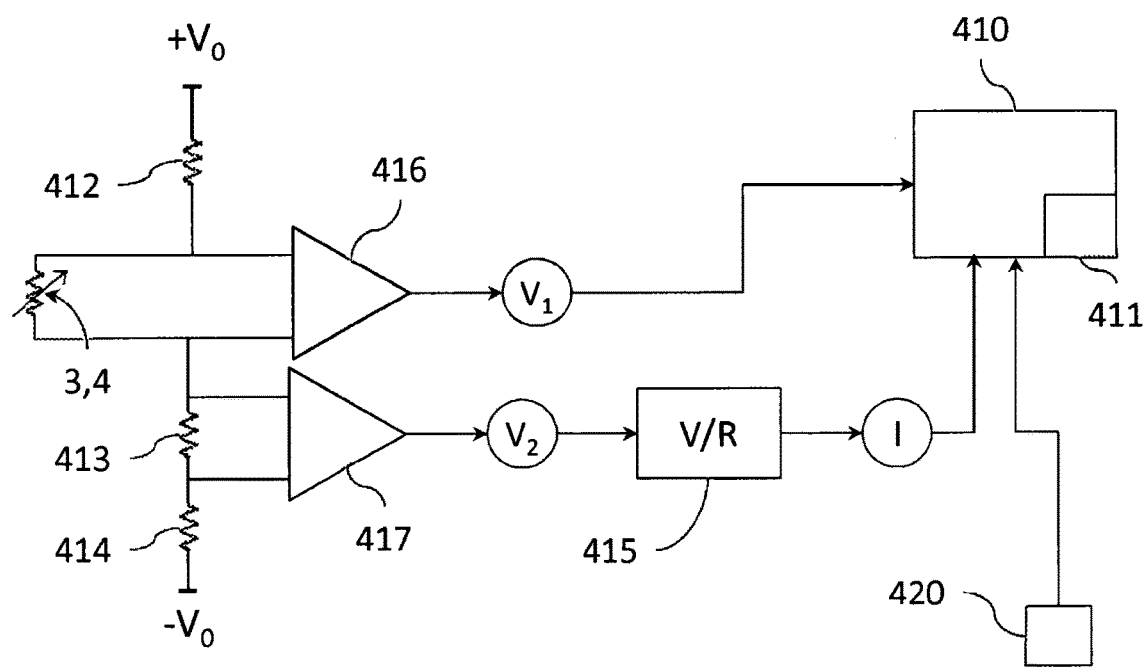

CORRECTION OF A TEMPERATURE MEASUREMENT OF A THERMOMETRIC RESISTANCE-TYPE TEMPERATURE PROBE

GENERAL TECHNICAL FIELD AND BACKGROUND OF THE INVENTION

The present invention concerns the field of aeronautics. More specifically the invention relates to a temperature measurement method and temperature measurement system.

Some temperature probes of resistance type known as Resistance Temperature Detectors (RTD) have two electrically conductive sensing elements on one same substrate, each of the sensing elements being connected to a measuring channel to measure the resistance of said sensing element.

FIGS. 1 and 2 illustrate a common example of a said temperature probe 1. The temperature probe 1 has two similar sensing elements 3, 4 arranged on one same substrate 2. Each sensing element 3, 4 is powered by a channel 6, 7 of the Full-Authority Digital Engine Control (FADEC) via a current, so that the voltage at the terminals of said sensing element 3, 4 is able to be measured and the resistance of said sensing element 3, 4 computed. A first sensing element 3 is therefore connected to a first channel 6 of the FADEC 5, and a second sensing element 4 is connected to a second channel 7 of the FADEC 5.

FIG. 1 therefore illustrates dual sensing elements 3, 4 wound on a mandrel forming the substrate 2. The two sensing elements 3, 4 are wound in parallel around the mandrel. In general, the two sensing elements 3, 4 are platinum wires. FIG. 2 shows a probe of film type in which the sensing elements 3, 4 are bonded adjacent one another on the substrate 2.

The resistance of a sensing element 3, 4, in metal in particular and more particularly in platinum is dependent on the temperature of said sensing element 3, 4.

Therefore by determining the resistance of a sensing element 3, 4 through knowledge of the current circulating therein and of the voltage at its terminals, it is possible to deduce therefrom the temperature of said sensing element 3, 4.

However, the feed current creates power dissipation via Joule effect generating self-heating of the sensing element 3, 4 inside which the current circulates, leading to a self-heating error in temperature measurement. Since power dissipation is dependent on the current I and on the resistance R of the sensing element, corresponding to $RI^2$, the feed current is chosen to be low, generally lower than 5 mA to limit these self-heating errors.

A self-heating error is also dependent on the mass flow rate of fluid e.g. air at the sensing element 3, 4, and hence at the temperature probe 1. FIG. 3 illustrates the influence of the mass flow rate of air (along the X-axis in Lbs/ft²·s) on self-heating error (along the Y-axis in °C./mW) expressed as temperature error per milliwatt of power dissipated via Joule effect.

FIG. 3 gives a mean curve 20 surrounded by a high curve 21 and a low curve 22 respectively, reflecting the mean and the high and low dispersions respectively of self-heating error as a function of air mass flow rate.

For safety reasons, each sensing element 3, 4 in the event of failure must be able to withstand a current of 22 mA without destruction and with return to normal after correction of the failure. Said failure may originate from the FADEC computer power unit or from a resistance short-circuiting in the resistive path of the probe power supply.

Yet this type of common fault, having intensity much higher than the nominal current, causes strong self-heating via Joule effect of the sensing element 3, 4 in which said fault current circulates.

For example a fault current $I_{fault}$ of 22 mA circulating in a sensing element 3, 4 having a resistance R of 200 ohms, induces dissipated power $P_{dissipated}$ of:

$$P_{dissipated} = R \times I_{fault}^2$$

$$P_{dissipated} = 200 \times 0.022^2$$

$$P_{dissipated} = 0.0968 \text{ W} = 100 \text{ mW}$$

By applying the mean curve 20 illustrated in FIG. 3, for an air mass flow rate of 6 lbs/ft²·s, a dissipated power $P_{dissipated}$ of 100 mW gives a mean error of 0.03×100=3° C. An error of 3° C. lies above an acceptable global error threshold, typically of 1.1° C.

Since the two sensing elements 3, 4 are positioned on one same substrate, the self-heating of one of the sensing elements 3, 4 is likely to propagate via thermal conduction to the other sensing element 3, 4. For example for a wound probe such as illustrated in FIG. 1, the parallel windings of the sensing elements 3, 4 are very close, in the order of about 60 μm. The temperature of the other sensing element 3, 4, in which there circulates a normal feed current, is therefore increased leading to an error in the temperature measurement of the fluid. As a result the measurement of one sensing element 3, 4 may be affected by a fault affecting the other sensing element 3, 4.

Therefore, in the event of an ordinary fault on the computer side which only affects one channel, the fault will be propagated to the entire probe 1 whose two channels 6, 7 will have the defect of an unacceptable error. Yet the duality of the sensing elements 3, 4 precisely has the objective of guaranteeing the availability of reliable temperature measurement even in the event of ill-functioning on one channel 6, 7 or one sensing element 3, 4.

There is therefore a risk of losing the two temperature measurement channels subsequent to an ordinary fault which should only affect one channel. Loss of air temperature measurement may lead to degraded engine performance even to stalling of the engine.

The measurement by said temperature probe is used in numerous engine control laws such as the position of the variable geometries of the high pressure compressor driven at low speed as per:

$$Xn25R = \frac{Xn25}{\sqrt{\frac{\text{temperature measurement}}{288.15}}}$$

Xn25 being the speed of the high pressure rotor of said compressor in revolutions per minute. Since control over transitory engine speeds has recourse to measurement of air temperature obtained with the temperature probe, the accuracy of such measurement is most important.

Various solutions have been proposed to overcome these disadvantages. FIG. 4 for example shows a probe 30 comprising two mandrels 31, 32, a sensing element 33, 34 being wound around each of the mandrels 31, 32. The sensing elements 33, 34 are therefore separate, the distance between them being sufficient so that a self-heating error at one sensing element 33, 34 does not cause a recovery error at the other sensing element 33, 34 via thermal conduction.

Such configuration has several drawbacks however. There is a distance between the sensing elements 33, 34, which may lead to differences in temperature measurement possibly preventing combined use of the two temperature measurements in some cases. In addition, a said probe 30 is more voluminous, heavier, has a higher drag coefficient (Cx) and hence a wider wake.

PRESENTATION OF THE INVENTION

The present invention sets out to propose a system allowing compensation of errors which distort temperature measurement by a sensing element of a temperature probe when a fault current exceeding a predetermined intensity passes through a sensing element of said temperature probe.

For this purpose a method is proposed for temperature measurement using a temperature probe of thermometric resistance type having at least two electrically conductive sensing elements on one same substrate, wherein different parameters are measured representing the intensity of the electric current circulating in one of said sensing elements, and wherein a correction as a function of said intensity of the electric current circulating in said sensing element is applied to a signal representing a temperature measurement derived from the other of said sensing elements, in order to correct an error due to self-heating via Joule effect of said sensing element which affects the other said sensing element.

The invention is advantageously but optionally completed by the following characteristics taken alone or in any technically possible combination:
 a correction that is a function of said intensity of the electric current circulating in said sensing element is applied to a signal representing a temperature measurement derived from said sensing element in order to correct an error due to self-heating via Joule effect of said sensing element which affects said sensing element;
 a fluid mass flow rate is determined at the temperature probe, and the correction applied to the signal representing a temperature measurement derived from the other of said sensing elements is also a function of the fluid mass flow rate at said temperature probe;
 a fluid mass flow rate is determined at the temperature probe, and the correction applied to the signal representing a temperature measurement derived from said sensing element is also a function of the fluid mass flow rate at said temperature probe.

Preferably the applied correction is determined from correction data previously stored in a memory, these correction data representing a relationship between the intensity of a current circulating in a sensing element, the fluid mass flow rate at said temperature probe and an error to be corrected.

For this purpose, the correction data are previously determined using the steps in which:
 a temperature probe is arranged in a fluid circulation device;
 one of the sensing elements of said probe is fed with a nominal electric current and the other of the sensing elements with a fault electric current, the fault electric current being of greater intensity than the nominal electric current;
 said probe is subjected to a fluid flow having a known fluid mass flow rate and a known temperature;
 a temperature measurement is recorded for each of said sensing elements;
 the correction data are determined from said temperature measurement for each of said sensing elements, from the known fluid mass flow rate and from the known temperature.

The invention also concerns a computer programme comprising programme code instructions to implement the steps of the method of the invention, when said method is run on a computer.

The invention also concerns a temperature measurement system comprising a temperature probe of thermometric resistance type having at least two electrically conductive sensing elements sharing one same substrate, said system comprising:
 means for measuring at least one parameter representing the intensity of an electric current circulating in one of said sensing elements; and
 a processing module adapted to apply a correction, that is a function of said intensity of the electric current circulating in said sensing element, to a signal representing a temperature measurement derived from the other of said sensing elements in order to correct an error due to self-heating via Joule effect of said sensing element which affects the other of said sensing elements.

Preferably the processing module is also adapted to apply a correction that is a function of said intensity of the electric current circulating in said sensing element to a signal representing a temperature measurement derived from said sensing element in order to correct an error due to self-heating via Joule effect of said sensing element affecting said sensing element.

Also preferably, the system further comprises means for determining a fluid mass flow rate at the temperature probe, and wherein the processing module is additionally adapted so that the correction applied to the signal representing a temperature measurement derived from one of said sensing elements is also a function of the fluid mass flow rate at said temperature probe.

The system preferably comprises a memory in which correction data are stored representing a relationship between the intensity of a current circulating in a sensing element, the fluid mass flow rate at the temperature probe and a temperature error to be corrected.

The system is preferably configured to implement the method of the invention.

PRESENTATION OF THE FIGURES

Other characteristics, objectives and advantages of the invention will become apparent from the following description which is solely illustrative and non-limiting, and is to be read in connection with the appended drawings amongst which:

FIGS. 1 and 2, already commented upon, illustrate an example of a temperature probe of thermometric resistance type having at least two electrically conductive sensing elements on and in one same substrate;

FIG. 3, already commented upon, gives curves illustrating the relationship between self-heating error and the air mass flow rate at the temperature probe;

FIG. 4, already commented upon, illustrates an example of a temperature probe in which the two sensing elements are arranged on different substrates;

FIG. 5 is a schematic illustrating a possible example of a measurement system set up on one channel;

DETAILED DESCRIPTION

Figure 1:
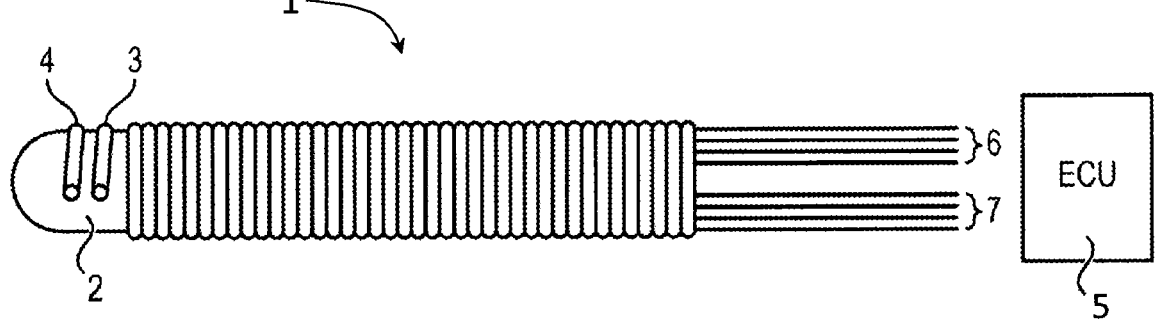

With reference to FIGS. 1, 2, 5 and 6, a temperature measurement system according to one possible embodiment of the invention comprises a temperature probe 1 of thermometric resistance type having at least two electrically conductive sensing elements 3, 4 sharing one same substrate 2. Each of the sensing elements 3, 4 is connected to a measuring channel 6, 7 to measure an electrical parameter of said sensing element 3, 4, said electrical parameter varying with temperature.

The temperature probe 1 is similar to a temperature probe known to the person skilled in the art such as illustrated in FIG. 1 and previously described.

The sensing elements 3, 4 are preferably in the form of metal wires, preferably in platinum, the electrical parameter varying with temperature is electric resistance for example, since the resistivity of a metal increases with temperature.

Therefore the determination of a signal representing said parameter varying with temperature allows the measuring of a temperature to which the temperature probe 1 is subjected. It is therefore possible to determine a temperature measurement from a signal output from at least one of said sensing elements 3, 4.

To determine the resistance of a sensing element 3, 4, a current must be circulated within said sensing element 3, 4. Power circuits 412, 413 allow the sensing elements 3, 4 to be fed with electric current.

Under Ohm's law relating together a voltage U at the terminals of an element, the resistance R of said element and the intensity I of the current passing through it so that $U=RI$, it is sufficient to determine two of the terms of this equation in order to be able to infer the third therefrom.

Therefore, when a current circulates in a sensing element 3, 4, knowledge of the voltage at the terminals of said sensing element 3, 4 and of the intensity of the current passing through the element, can be used to determine the resistance thereof and hence its temperature.

The system therefore comprises means for measuring different parameters representing intensities of the electric currents circulating in each of said sensing elements 3, 4.

FIG. 5 shows an example of measuring means of the measurement processing channel of a sensing element 3, 4. At the terminals of said sensing element 3, 4 a first voltage measuring device 416 is connected, supplying a voltage $V_1$ to a processing module 410. On one terminal of the sensing element 3, 4 there is connected a first resistive element 412, itself connected via its other terminal to a high voltage supply $+V_0$.

On the other terminal of the sensing element 3, 4 there is connected a second resistive element 413 of known resistance, on the terminals of which there is connected a second voltage device 417 supplying a voltage $V_2$, from which parameter I is obtained representing the intensity of the electric current circulating in the sensing element 3, 4, via a V/R converter. Parameter I is then sent to the processing module 410. A third resistive element 414 connects one of the terminals of said second resistive element 413 to a low voltage supply $-V_0$.

Figure 6:
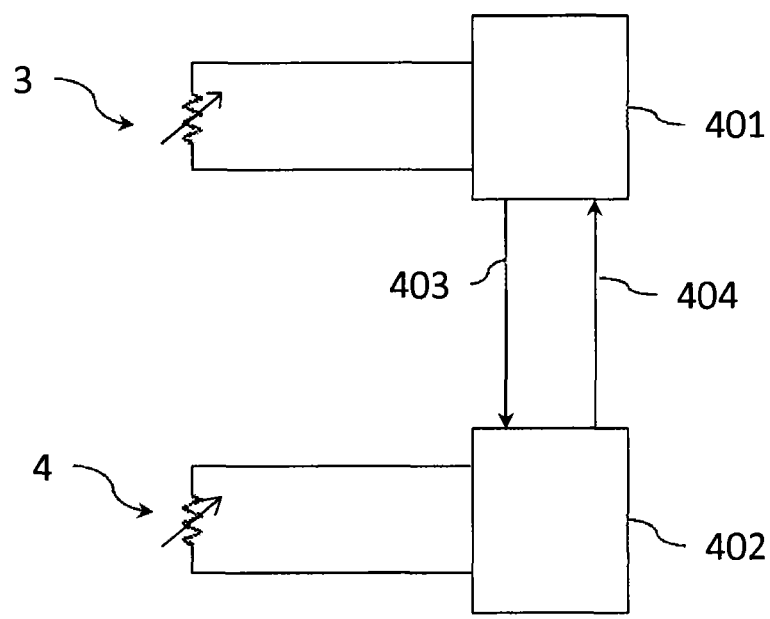
FIG. 6 is a schematic illustrating a measurement system according to one possible embodiment of the invention.

FIG. 6 illustrates the data exchange between the two processing channels 401, 402. Each of the processing channels 401 (respectively 402) transmits data to the other relating to the intensity of the electric current circulating in the sensing element 3 (respectively 4) with which said channel 401 (respectively 402) is associated. For example the processing channel 401, associated with the first sensing element 3, transmits data 403 relating to the intensity of the electric current circulating in said first sensing element 3 to the processing channel 402 associated with the second sensing element 4, whilst the processing channel 402, associated with said second sensing element 4, transmits data 404 relating to the intensity of the electric current circulating in said second sensing element 4 to the processing channel 401 associated with the first sensing element 3.

The systems illustrated in FIGS. 5 and 6 are non-limiting examples. Other configurations can be envisaged by the person skilled in the art to provide a current supply to the sensing elements 3, 4 in order to determine temperature measurement from a signal output by at least one of said sensing elements 3, 4 to measure different parameters representing intensities of electric currents circulating in each of said sensing elements 3, 4, and so that data on the intensity of the electric current circulating in one of said sensing elements 3, 4 is taken into account to correct a measurement by the other sensing element 3, 4.

The system may also comprise means for determining a parameter representing a fluid mass flow rate at said temperature probe 1. A parameter representing the fluid mass flow rate can be provided by devices external to the system, in particular in particular to draw advantage from sensors distributed elsewhere in the apparatus.

In the system in FIG. 5, a sensor 420 is used to obtain a parameter representing the fluid mass flow rate at said temperature probe 1, from which said fluid mass flow rate can be calculated. This representative parameter may be the fluid flow velocity for example, and the sensor 420 may be a probe of Pitot tube type. This parameter representing the fluid mass flow rate is also sent to the processing module 410.

Temperature measurement is determined from a signal output from a least one of said sensing elements 3, 4, said temperature measurement possibly being determined by the processing module 410 or by an external computing unit and then sent to the processing module 410.

This processing module 410 may be the Air Data Computer or the FADEC, or any other on-board device equipped with processing means, in particular a computer.

The system 400 comprises a memory 411 in which correction data are stored representing a relationship between the intensity of a current circulating in a sensing element 3, 4, the fluid mass flow rate at the temperature probe 1 and an error to be corrected. More specifically, the correction data distinguish first between data relating to correction of an error due to self-heating of the sensing element 3, 4 from which the measurement is derived and to which said correction is to be applied, and secondly data relating to correction of an error due to self-heating of the other sensing element 3, 4 from which said measurement is not derived but to which said correction is applied.

Some correction data therefore take into consideration the intensity of a current circulating in the sensitive element 3, 4 from which the measurement is obtained and to which said correction is to be applied, whilst other correction data take into account the intensity of a current circulating in the other sensing element 3, 4 other than the element from which the measurement is derived but to which said correction is applied.

The memory 411 can be integrated in the processing module 410, as illustrated in FIG. 4, or it may be remote in which case said data can be accessed by the processing module 410.

Figure 2:
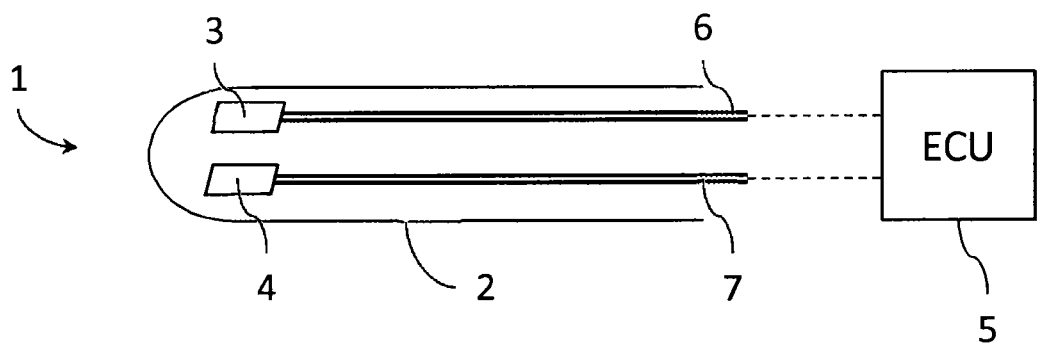

These correction data may, in particular, be in the form of correction charts allowing the evaluation of temperature error as a function of air mass flow similar to the curves shown in FIG. 2.

According to one possible embodiment of the method of the invention, to obtain a corrected temperature measurement the sensing elements 3, 4 are fed with a current.

A temperature measurement is determined from a signal output from at least one of said sensing elements 3, 4, in particular via measurement channels 6, 7. For example the signal output from at least one of said sensing elements 3, 4 may be a signal representing the resistance of a sensing element 3, 4, e.g. a voltage measurement.

Parameters are measured representing intensities of the electric currents circulating in each of said sensing elements 3, 4. The voltage measurement device 417 allows measurement of the voltage at the terminals of the resistive element 413, and the resistance of said resistive elements 413 being known, it is possible to infer therefrom the intensity of the electric current circulating in a sensing element 3, 4. It is therefore possible to determine parameters representing intensities of the electric currents circulating in each of said sensing elements 3, 4.

A parameter is measured representing the air mass flow rate at the temperature probe 1, e.g. by means of the sensor 420.

The processing module 410 corrects the temperature measurement as a function of these measurements of said different parameters. As indicated above, the measurement of a temperature using a temperature probe 1 of thermometric resistance type may be flawed by an error due to self-heating via Joule effect of one of the sensing elements 3, 4. This self-heating error may also, via conduction, affect the other sensing element 3, 4.

Knowledge of the intensity of the current passing through each of the sensing elements 3, 4 through determination of parameters representing the intensity of the electric current circulating in each of said sensing elements 3, 4, allows determination of the type of error affecting each sensing element 3, 4. The correction made to the temperature measurement of a sensing element 3, 4 can therefore be chosen as a function of the fault status of said sensing element 3, 4 or of the other sensing element 3, 4. A correction that is a function of said intensity of electric current circulating in a sensing element 3, 4 is applied to a signal representing a temperature measurement obtained from the other of said sensing elements 3, 4 to correct an error due to self-heating via Joule effect of said sensing element 3, 4 affecting the other of said sensing elements 3, 4.

Similarly, a correction that is a function of said intensity of the electric current circulating in a sensing element 3, 4 can be applied to a signal representing a temperature measurement obtained from said sensing element 3, 4 to correct an error due to self-heating via Joule effect of said sensing element 3, 4 affecting said sensing element 3, 4.

It is possible to compare the measurements of parameters representing current intensities with thresholds, the processing module 410 correcting the temperature measurement in relation to the result of these comparisons.

In particular, the measurement of the parameter representing the intensity of the current circulating in the sensing element 3, 4 from which the temperature is measured is compared with a current threshold characterizing self-heating via Joule effect of said sensing element 3, 4, and the processing module 410 corrects the temperature measurement as per a mode intended to correct the effect due to this self-heating.

The correction applied by the processing module 410 can therefore correct an error in temperature measurement made by a sensing element 3, 4 due to self-heating via Joule effect of said sensing element 3, 4, the correction being a function of the parameter representing the intensity of the electric current circulating in said sensing element 3, 4.

Additionally, it is possible to compare the measurement of the parameter representing the intensity of the current circulating in one sensing element 3, 4 with a current threshold characterizing self-heating via Joule effect of said sensing element 3, 4 and the processing module 410 corrects the temperature measurement obtained from the other sensing element 3, 4 as per a mode intended to correct the effect due to this self-heating.

The temperature correction can therefore correct an error in the temperature measurement of one sensing element 3, 4 due to self-heating via Joule effect of the other sensing element 3, 4, the correction being a function of the parameter representing the intensity of the electric current circulating in said other sensing element 3, 4.

As soon as the measurement of a parameter representing the intensity of the current circulating in a sensing element 3, 4 exceeds a first significance threshold, this means that the self-heating error through Joule effect distorting the temperature measurement by said sensing element has become non-negligible and a correction as per a first mode is applied to the temperature measurement obtained from said sensing element 3, 4 to compensate the effects thereof.

Also, as soon as the measurement of a parameter representing the intensity of the current circulating in one sensing element 3, 4 exceeds a second significance threshold which may be different from the first threshold, this means that the self-heating via Joule effect of said sensing element will affect the temperature measurement by the other sensing element 3, 4 causing an error in the temperature measurement by the other said sensing element 3, 4, and a correction as per a second mode is applied to the temperature measurement obtained from said other sensing element 3, 4.

Having knowledge of the fault status of each measurement channel 6, 7, it is therefore possible to choose the correction mode to be applied, and having knowledge of the different parameters representing intensities of electric currents circulating in each of said sensing elements 3, 4, and of the fluid mass flow rate at the temperature probe 1, it is possible to quantify the correction to be applied to temperature using the correction data.

Figure 3:
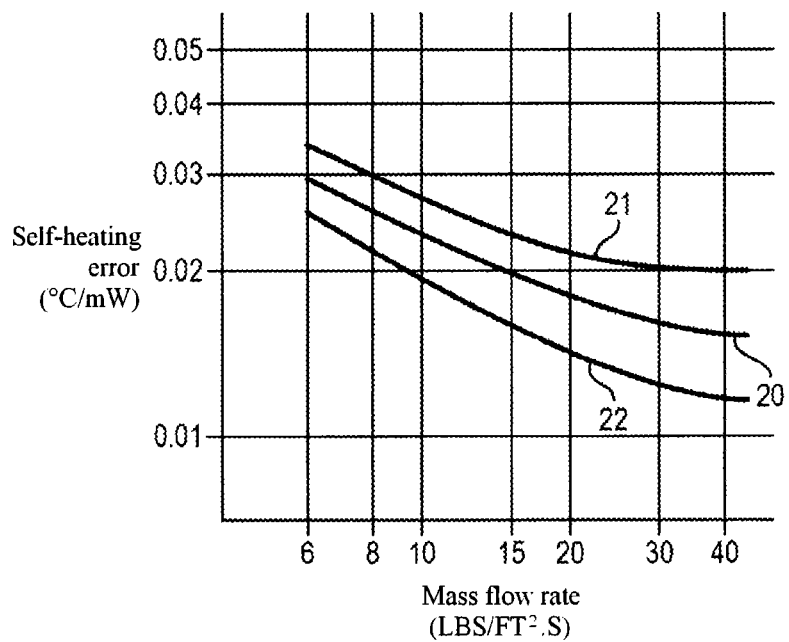

To come back to an example given above and with reference to FIG. 3, a current of 22 mA in a sensing element 3, 4 having a resistance of 200 ohms induces a dissipated power of about 100 mW which, at an air mass flow rate of 6 lbs/ft$^2$·s, gives a mean self-heating error on temperature measurement of +3° C. for the temperature obtained from a signal output from said sensing element 3, 4. The correction data can therefore, for example, associate a correction of −3° C. with an intensity of 22 mA and air mass flow rate of 6 lbs/ft$^2$·s.

Preferably the temperature correction is applied when the parameter representing the intensity of the electric current circulating in at least one of the sensing elements 3, 4 exceeds a given threshold. Temperature measurement is effectively only affected by a significant self-heating error when the intensity of the current is sufficiently high so that the power dissipated by Joule effect in a sensing element 3, 4 leads to a rise in temperature higher than a tolerance threshold for temperature measurement. The given threshold may also correspond to a fault current which may be reached in a sensing element 3, 4. In the example indicated above, this fault current is 22 mA.

The processing module 410 computes a correction of temperature measurement as a function of correction data previously stored in a memory 411, these data representing a relationship between the intensity of a current circulating in a sensing element 3, 4, the air mass flow rate at said temperature probe 1 and a temperature error to be corrected.

As indicated above, these correction data may in particular take on the form of correction charts allowing a temperature error to be evaluated as a function of air mass flow rate, similar to the curves illustrated in FIG. 2.

In particular, having knowledge of the intensity of the current circulating in one sensing element 3, 4, the power dissipated in said sensing element 3, 4 via Joule effect can be inferred therefrom. It is then possible to apply a correction of the temperature measurement as a function of the air mass flow rate at the probe 1.

Figure 7:
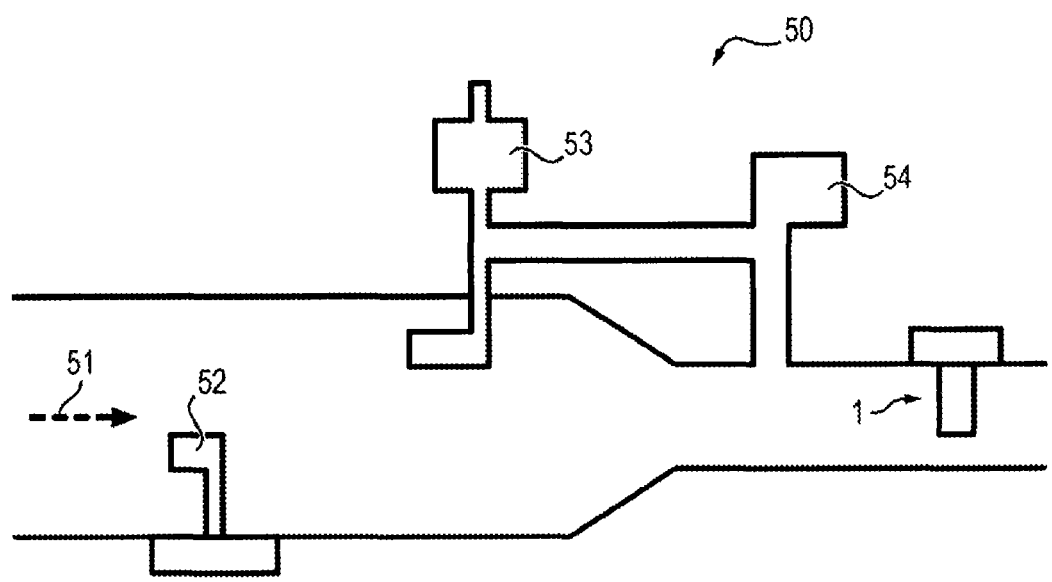
FIG. 7 illustrates a possible configuration of means for acquiring correction data.

With reference to FIG. 7, for previous determination of the correction data, a temperature 1 probe is arranged in a wind tunnel 50. One of the sensing elements 3, 4 of said probe 1 is fed with a nominal electric current and the other sensing element 3, 4 with a fault electric current, the fault electric current having a higher intensity than the nominal electric current. For example, the nominal current corresponds to a current supply of intensity lower than 5 mA, and the fault current has an intensity of 22 mA.

Said probe is subjected to a flow of fluid 51 of known fluid mass flow rate and of known temperature. For this purpose, a temperature measuring device 52 provides the temperature of said flow of fluid 51, whilst sensors 53, 54 e.g. of Pitot tube type provide a value representing the fluid mass flow rate at the probe 1.

A temperature measurement is recorded for each of said sensing elements 3, 4, without correction.

The fluid flow can be modified and/or the intensity of the current passing through the sensing elements 3, 4 to record temperature measurements for different air mass flow rates and/or different current intensities.

Finally, the correction data are determined from said temperature measurement, from the known fluid mass flow rate and from the known temperature. These correction data are then stored in a memory 411 and made accessible to the processing module 410.

The invention claimed is:

1. A temperature measurement method using a temperature probe of thermometric resistance type having at least two electrically conductive sensing elements on one same substrate, wherein different parameters are measured representing the intensity of the electric current circulating in one of said sensing elements,
    wherein a correction that is a function of said intensity of the electric current circulating in said one of said sensing elements is applied to a signal representing a temperature measurement derived from the other of said sensing elements to correct an error due to self-heating via Joule effect of said one of said sensing elements affecting the other of said sensing elements.

2. The method according to claim 1, wherein a fluid mass flow rate is determined at the temperature probe, and the correction applied to the signal representing a temperature measurement derived from the other of said sensing elements is also a function of the fluid mass flow rate at said temperature probe.

3. The method according to claim 1, wherein the correction that is a function of said intensity of the electric current circulating in said one of said sensing elements is applied to a signal representing a temperature measurement derived from said one of said sensing elements to correct an error due to self-heating via Joule effect of said one of said sensing elements affecting said one of said sensing elements.

4. The method according to claim 3, wherein a fluid mass flow rate is determined at the temperature probe, and the correction applied to the signal representing a temperature measurement derived from said one of said sensing elements is also a function of the fluid mass flow rate at said temperature probe.

5. The method according to claim 1, wherein the correction applied is determined from correction data previously stored in a memory, these correction data representing a relationship between the intensity of a current circulating in said one of said sensing elements, the fluid mass flow rate at said temperature probe, and an error to be corrected.

6. The method according to claim 5, wherein the correction data are previously determined by the steps of:
    arranging the temperature probe in a fluid circulation device;
    feeding one of the sensing elements of said probe with a nominal electric current and the other of the sensing elements with a fault electric current, the fault electric current having a higher intensity than the nominal electric current;
    subjecting said probe to a flow of fluid of known fluid mass flow rate and of known temperature;
    recording a temperature measurement for each of said sensing elements;
    determining correction data from said temperature measurement for each of said sensing elements, from the known fluid mass flow rate and from the known temperature.

7. A computer programme comprising programme code instructions to implement the steps of the method according to claim 1, when said method is run on a computer.

8. A temperature measurement system comprising a temperature probe of thermometric resistance type having at least two electrically conductive sensing elements sharing one same substrate, said system comprising:
    means for measuring at least one parameter representing the intensity of an electric current circulating in one of said sensing elements; and
    a processing module adapted to apply a correction, that is a function of said intensity of the electric current circulating in said one of said sensing elements, to a signal representing a temperature measurement derived from the other of said sensing elements in order to correct an error due to self-heating via Joule effect of said one of said sensing elements affecting the other of said sensing elements.

9. The system according to claim 8, wherein the processing module is further adapted to apply the correction, that is a function of said intensity of the electric current circulating in said one of said sensing elements, to a signal representing a temperature measurement derived from said one of said sensing elements in order to correct an error due to self-heating via Joule effect of said one of said sensing elements affecting said one of said sensing elements.

10. The system according to claim 8, further comprising means for determining a fluid mass flow rate at the temperature probe, and wherein the processing module is further adapted so that the correction applied to the signal representing a temperature measurement derived from the other of said sensing elements is also a function of the fluid mass flow rate at said temperature probe.

11. The system according to claim 10, comprising a memory in which correction data are stored representing a relationship between the intensity of a current circulating in said one of the sensing elements, the fluid mass flow rate at said temperature probe, and an error in temperature measurement to be corrected.

\* \* \* \* \*